(12) United States Patent
Biswas et al.

(10) Patent No.: US 12,091,351 B2
(45) Date of Patent: Sep. 17, 2024

(54) APPARATUS AND METHOD FOR MITIGATING ELECTROCHEMICAL ATTACK OF PRECIOUS METAL COMPONENTS IN A GLASS MAKING PROCESS

(71) Applicant: CORNING INCORPORATED, Corning, NY (US)

(72) Inventors: Samir Biswas, Horseheads, NY (US); Aaron Joshua Hade, Corning, NY (US); David Myron Lineman, Painted Post, NY (US); Steven Robert Moshier, Horseheads, NY (US); Nicholas Scott Ryan, Dublin, CA (US)

(73) Assignee: CORNING INCORPORATED, Corning, NY (US)

( * ) Notice: Subject to any disclaimer, the term of this patent is extended or adjusted under 35 U.S.C. 154(b) by 789 days.

(21) Appl. No.: 17/279,486

(22) PCT Filed: Sep. 20, 2019

(86) PCT No.: PCT/US2019/052066
§ 371 (c)(1),
(2) Date: Mar. 24, 2021

(87) PCT Pub. No.: WO2020/068568
PCT Pub. Date: Apr. 2, 2020

(65) Prior Publication Data
US 2022/0009814 A1    Jan. 13, 2022

Related U.S. Application Data

(60) Provisional application No. 62/738,129, filed on Sep. 28, 2018.

(51) Int. Cl.
C03B 5/027    (2006.01)
C03B 17/06    (2006.01)
(Continued)

(52) U.S. Cl.
CPC .............. C03B 5/027 (2013.01); C03B 17/06 (2013.01); C03B 18/02 (2013.01); H05B 3/03 (2013.01)

(58) Field of Classification Search
CPC ....... A61B 8/4281; A61B 8/4483; B06B 1/02; G10K 11/18; G10K 11/26; B67D 1/0042;
(Continued)

(56) References Cited

U.S. PATENT DOCUMENTS 2,899,476 A    8/1959  Gell
3,683,093 A    8/1972  Gell et al.
(Continued)

FOREIGN PATENT DOCUMENTS

CN    2061563 U    9/1990
CN    1297854 A    6/2001
(Continued)

OTHER PUBLICATIONS

Chinese Patent Application No. 201980078340.7, Office Action, dated Aug. 25, 2022, 4 pages Chinese Patent Office.
(Continued)

*Primary Examiner* — Quang T Van
(74) *Attorney, Agent, or Firm* — Kevin M. Able (57) ABSTRACT

Apparatus and methods are disclosed for forming a glass article in which molten glass is heated in a refractory vessel by establishing an electrical current in the molten glass between opposing powered electrodes along a first electrical path. The melting vessel includes a precious metal component in contact with the molten glass, and at least one non-powered electrode proximate the precious metal component. The at least one non-powered electrode and the precious metal component form second and third electrical paths, respectively, in parallel with the first electrical path such that an electrical current in the second electrical path is
(Continued)

decreased, thereby reducing an electrochemical reaction in the precious metal component.

18 Claims, 6 Drawing Sheets

(51) Int. Cl.
    *C03B 18/02*     (2006.01)
    *H05B 3/03*     (2006.01)

(58) Field of Classification Search
    CPC .. B67D 1/0831; B67D 1/0832; B67D 1/0845; B67D 1/0878
    USPC ........ 373/18, 20, 22, 27, 28, 29, 37, 41, 60, 373/62, 72, 74, 76, 81, 82, 84; 219/121.38; 430/108.1, 108.2, 108.21, 430/108.23; 65/35, 121, 126, 134.7, 65/135.6, 135.9, 355
    See application file for complete search history.

(56) References Cited

U.S. PATENT DOCUMENTS

| | | | |
|---|---|---|---|
| 3,967,046 | A | 6/1976 | Froberg et al. |
| 4,149,022 | A * | 4/1979 | Hrycik .................... C03B 5/027 373/40 |
| 4,247,733 | A * | 1/1981 | Stevenson ............ H05B 3/0023 373/41 |
| 4,410,997 | A | 10/1983 | Gell et al. |
| 4,607,372 | A | 8/1986 | Martin et al. |
| 4,638,490 | A | 1/1987 | Dunn et al. |
| 5,574,746 | A | 11/1996 | Ammon et al. |
| 6,629,437 | B1 | 10/2003 | Baucke et al. |
| 8,356,492 | B2 | 1/2013 | Suzuki et al. |
| 2006/0016222 | A1 | 1/2006 | Pfeiffer et al. |
| 2006/0144089 | A1 | 7/2006 | Eichholz et al. |
| 2011/0079047 | A1 | 4/2011 | Suzuki et al. |
| 2020/0262731 | A1 | 8/2020 | Cook et al. |

FOREIGN PATENT DOCUMENTS

| | | |
|---|---|---|
| CN | 1721348 A | 1/2006 |
| CN | 102031558 A | 4/2011 |
| CN | 106396340 A | 2/2017 |
| DE | 102010036627 A1 | 1/2012 |
| JP | 2001-172024 A | 6/2001 |
| JP | 2006-028014 A | 2/2006 |
| JP | 2012-162422 A | 8/2012 |
| JP | 2017-030987 A | 2/2017 |
| KR | 10-2008-0011658 A | 2/2008 |
| KR | 10-2013-0112065 A | 10/2013 |
| KR | 10-2013-0113973 A | 10/2013 |
| TW | 200616914 A | 6/2006 |
| TW | 201829324 A | 8/2018 |
| WO | 2018/089436 A1 | 5/2018 |

OTHER PUBLICATIONS

Bolitz et al. "Electrochemical Corrosion of Molybdenum Electrodes in Soda-Lime Glass Containing Antimony" 18th Plansee Seminar, RM 26, 2013, 12 pages.
International Search Report and Written Opinion of the International Searching Authority;PCT/US2019/052062; Mailed on Jan. 13, 2020, 10 pages; European Patent Office.
International Search Report and Written Opinion of the International Searching Authority;PCT/US2019/052066; Mailed on Jan. 20, 2020, 12 pages; European Patent Office.
Taiwanese Patent Application No. 108135033, Office Action dated May 3, 2023, 2 pages (English Translation Only); Taiwanese Patent Office.
Chinese Patent Application No. 201980074699.7, Office Action, dated Jun. 28, 2022, 14 pages, (7 pages of English Translation and 7 pages of Original Copy); Chinese Patent Office.

* cited by examiner

APPARATUS AND METHOD FOR MITIGATING ELECTROCHEMICAL ATTACK OF PRECIOUS METAL COMPONENTS IN A GLASS MAKING PROCESS

CROSS-REFERENCE TO RELATED APPLICATIONS

This application is a national stage application under 35 U.S.C. § 371 of International Application No. PCT/US2019/052066, filed on Sep. 20, 2019, which claims the benefit of priority of U.S. Provisional Application Ser. No. 62/738,129 filed on Sep. 28, 2018 the contents of which are relied upon and incorporated herein by reference in their entirety as if fully set forth below.

BACKGROUND

Field

The present disclosure relates to an apparatus and method for forming a glass article, and more particularly an apparatus and method for mitigating electrochemical attack of precious metal components in a refractory vessel for producing the glass article.

TECHNICAL BACKGROUND

In the commercial melting of glass, there are two primary means of inputting energy into the melting process: Conduction or radiation of energy from the combustion of fossil fuels, and/or joule heating of the glass by establishing an electrical current between electrodes immersed therein. Electrical energy is preferred because of its higher efficiency, less environmental impact and process flexibility. However, batch (precursor) materials are generally non-conducting and therefore non-electrical methods can be used, either as an initial heating method, or a heat augmenting method. For example, in some methods, a combination of fossil fuel and electricity can be used as the sources of energy, wherein batch materials are initially heated by combustion burners to form an electrically conductive molten material, and then the molten material (hereinafter "molten glass") is further heated by an electrical current.

For most glasses utilizing electrical current to heat the molten glass, electrodes are immersed in the molten glass along at least a portion of the melting vessel length near or in the refractory wall of the melting vessel. Typically, the electrodes are arranged so that electrodes along one side of the melting vessel have corresponding electrodes along the other side of the melting vessel to which they electrically "fire" (i.e., pass an electrical current) through the molten glass. For a given melting vessel, there can be multiple independently-controlled electrical circuits that provide alternating current across the width of the melting vessel. It was previously thought the electrical current in a given electrical circuit traveled through the molten glass from one electrode and out of the melting vessel at the corresponding electrode on the opposite side of the melting vessel with little to no interaction with other components in the melting vessel. Recent experimental work has shown that the electrical current extending across the melting vessel can also conduct through and interact with metal components in the melting vessel such as connecting conduits, thermocouple sheaths, bubbler tubes, taps or other metal components. Many of these metal components can be formed from a precious metal, for example platinum group metals or alloys thereof, to resist the high temperature and corrosive environment of the molten glass. Because these precious metals have a resistivity orders of magnitude lower than molten glass, a precious metal component in or near the voltage field between the electrodes can become an electrical current path. Accordingly, electrical current enters the precious metal component on a side of the precious metal component facing one of the electrodes in the circuit and exits the precious metal component on the opposite side facing the opposing electrode in the circuit. The magnitude of this electrical current is directly proportional to the electrical current applied to a given electrode circuit. Electrical current firing through precious metal can attack the precious metal and generate gases that form inclusions (seeds) in the molten glass. This precious metal attack can also produce solid inclusions as the precious metal component corrodes in the molten glass, as well as impairment and/or destruction of the precious metal component. As the glass industry moves to low and ultra-low resistivity glasses for electronic display or other applications, precious metal attack is increasingly problematic because of the greater electrical current values needed to obtain an equivalent electrical power into the molten glass. Autopsies of conduits leading from melting vessels producing such glasses have shown measurable attack of the precious metal from this mechanism.

What is needed is a method of reducing electrical current through precious metal components that may be exposed to the molten glass in a melting vessel utilizing Joule heating, thereby reducing gaseous and/or particulate inclusions.

SUMMARY

In accordance with the present disclosure, an apparatus for forming a glass article is disclosed, comprising a refractory vessel defining a space interior to the refractory vessel, a plurality of powered electrodes exposed to the interior space, a precious metal component exposed to the interior space, and at least one non-powered electrode positioned in the interior space proximate the precious metal component and configured to shunt an electrical current from the precious metal component. For example, the apparatus can comprise an electrical power supply connected to the plurality of powered electrodes through an electrical conductor, the plurality of powered electrodes and the electrical power supply comprising a first electrical current path; the precious metal component, the electrical power supply and the plurality of powered electrodes comprising a second electrical current path, at least a portion of the second electrical current path parallel to at least a portion of the first electrical current path; and the at least one non-powered electrode, the electrical power supply and the plurality of powered electrodes comprising a third electrical current path, at least a portion of the third electrical current path parallel with the at least a portion of the second electrical current path.

The at least one non-powered electrode can, for example, comprise a plurality of non-powered electrodes, for example a pair of non-powered electrodes, extending into the interior space through a bottom wall of the refractory vessel. In some embodiments, the plurality of non-powered electrodes extending through the bottom wall of the refractory vessel can be connected by an electrical conductor positioned outside the interior space.

In some embodiments, the at least one non-powered electrode can comprise a plurality of non-powered electrodes, for example a pair of non-powered electrodes, extending into the interior space through a wall of the refractory vessel. The plurality of non-powered electrodes extending through a wall of the refractory vessel can, for example, be connected by an electrical conductor positioned outside the interior space.

In some embodiments, the at least one non-powered electrode can comprise a plurality of non-powered electrodes, for example a pair of non-powered electrodes, extending into the interior space through a ceiling of the refractory vessel. The plurality of non-powered electrodes extending through the ceiling can, for example, be connected by an electrical conductor not in contact with an atmosphere in the interior space.

In various embodiments, the plurality of powered electrodes can be arranged in rows along at least a portion of a length of the refractory vessel.

The plurality of powered electrodes can extend into the interior space through a bottom wall of the refractory vessel, although in further embodiments, the plurality of powered electrodes can be exposed to the interior space through walls of the refractory vessel.

In embodiments, the plurality of powered electrodes can comprise tin or molybdenum. For example, the powered electrodes can comprise molybdenum (Mo), $MoZrO_2$, or tin oxide (e.g., $SnO_2$).

In embodiments, the at least one non-powered electrode can comprise tin or molybdenum. For example, the non-powered electrodes can comprise molybdenum (Mo), $MoZrO_2$, or tin oxide (e.g., $SnO_2$)

In various embodiments, the precious metal component can comprise at least one of a bubbler tube, a thermocouple, or a conduit configured as a flow path for molten glass.

In other embodiments, an apparatus for forming a glass article is disclosed, the apparatus comprising a melting vessel defining a melting space interior to the melting vessel; a first powered electrode and a second powered electrode, the first powered electrode and the second powered electrode exposed to the melting space and comprising a first electrical current path between the first and second powered electrodes; an electrical power supply connected to the first and second powered electrodes; a precious metal component exposed to the melting space, the precious metal component comprising a second electrical current path between the first and second powered electrodes, at least a portion of the second electrical current path in parallel with at least a portion of the first electrical path; and at least one non-powered electrode positioned in the melting space proximate the precious metal component and comprising a third electrical path between the first and second powered electrodes, at least a portion of the third electrical current path in parallel with the at least a portion of the second electrical path.

The at least one non-powered electrode can extend into the melting space through a bottom wall of the melting vessel. In other embodiments, the at least one non-powered electrode can extend through a wall of the melting vessel, and in still other embodiments, the at least one non-powered electrode can extend through a ceiling of the melting vessel. In some embodiments, the at least one non-powered electrode can extend through any one or more of a bottom wall of the melting vessel, a wall of the melting vessel, or a ceiling of the melting vessel.

In embodiments where the at least one non-powered electrode extends through a ceiling of the melting vessel, and through at atmosphere above the molten glass (e.g., above the melting space), the at least one non-powered electrode can comprise a cladding layer. The cladding layer can, for example, comprise a precious metal cladding layer.

In some embodiments, the at least one non-powered electrode can comprise a plurality of non-powered electrodes connected by an electrical conductor outside the melting space.

In various embodiments, the first and second powered electrodes can comprise tin or molybdenum. For example, the first and second powered electrodes can comprise Mo, $MoZrO_2$, or $SnO_2$.

In various embodiments, the at least one non-powered electrode can comprise tin or molybdenum. For example, the at least one non-powered electrode can comprise Mo, $MoZrO_2$, or $SnO_2$.

In embodiments, the precious metal component can comprise at least one of a bubbler tube, a thermocouple, or a conduit configured as a flow path for molten glass.

In still other embodiments, a method for forming a glass article is described, comprising establishing a first electrical current along a first electrical current path between a plurality of powered electrodes in a melting space of a melting vessel, the melting space comprising molten glass and a precious metal component in contact with the molten glass, the first electrical current path extending through the molten glass and not the precious metal component; establishing a second electrical current along a second electrical current path in the molten glass between the plurality of powered electrodes, at least a portion of the second electrical current path comprising the precious metal component and in parallel with at least a portion of the first electrical current path; and establishing a third electrical current along a third electrical current path in the molten glass between the plurality of powered electrodes, at least a portion of the third electrical current path comprising at least one non-powered electrode proximate the precious metal component such that at least a portion of the third electrical current path is in parallel with the second electrical current path.

In embodiments, an electrical resistance of the third electrical path can be less than an electrical resistance of the second electrical path.

The precious metal component can comprise platinum, for example a platinum alloy such as a platinum-rhodium alloy.

In some embodiments, the precious metal component can comprise at least one of a thermocouple, a bubbler tube, or a conduit configured as a flow path for the molten glass.

In various embodiments, the at least one non-powered electrode can comprise tin or molybdenum. For example, the at least one non-powered electrode can comprise Mo, $MoZrO_2$, or $SnO_2$.

In various embodiments, the pair of powered electrodes can comprise tin or molybdenum. For example, the first and second powered electrodes can comprise Mo, $MoZrO_2$, or $SnO_2$.

In some embodiments, the at least one non-powered electrode can comprise at least two non-powered electrodes connected by an electrical conductor not in contact with the molten glass.

The method may further comprise drawing the molten glass from a forming body to produce the glass article.

In some embodiments, the glass article is a glass ribbon, although in other embodiments the glass article can be a rod, a sheet, a tube, a container, an envelope, or any other shape for an intended end use.

In some embodiments, the method may further comprise cutting the glass ribbon to form a separated glass ribbon (e.g., a glass sheet).

In still other embodiments, apparatus for forming a glass article are described, comprising a refractory vessel defining a melting space interior to the refractory vessel, a plurality of powered electrodes positioned in the melting space, the plurality of powered electrodes electrically connected to an electrical power supply, a precious metal component at least partially positioned in the melting space, the precious metal component not electrically connected to the electrical power supply, and at least one non-powered electrode positioned in the interior space proximate the precious metal component, the at least one non-powered electrode not electrically connected to the electrical power supply.

The at least one non-powered electrode can comprise molybdenum or tin.

In embodiments, the precious metal component can comprise at least one of a bubbler tube, a thermocouple, or a conduit configured as a flow path for molten glass In some embodiments, the apparatus may further comprise a quantity of molten glass contained within the melting space and in contact with the plurality of powered electrodes, the precious metal component and the at least one non-powered electrode.

In some embodiments, the plurality of powered electrodes can define a first electrical current path through the molten glass, the plurality of powered electrodes and the precious metal component can define a second electrical current path through the molten glass in parallel with the first electrical current path, and the plurality of powered electrodes and the at least one non-powered electrode can define a third electrical current path through the molten glass in parallel with the second electrical current path.

Additional features and advantages of the embodiments disclosed herein will be set forth in the detailed description that follows, and in part will be clear to those skilled in the art from that description or recognized by practicing the embodiments described herein, including the detailed description which follows, the claims, as well as the appended drawings.

It is to be understood that both the foregoing general description and the following detailed description present embodiments intended to provide an overview or framework for understanding the nature and character of the embodiments disclosed herein. The accompanying drawings are included to provide further understanding, and are incorporated into and constitute a part of this specification. The drawings illustrate various embodiments of the disclosure, and together with the description explain the principles and operations thereof.

DETAILED DESCRIPTION

Reference will now be made in detail to embodiments of the present disclosure, examples of which are illustrated in the accompanying drawings. Whenever possible, the same reference numerals will be used throughout the drawings to refer to the same or like parts. However, this disclosure may be embodied in many different forms and should not be construed as limited to the embodiments set forth herein.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Ranges can be expressed herein as from "about" one particular value, and/or to "about" another particular value. When such a range is expressed, another embodiment includes from the one particular value to the other particular value. Similarly, when values are expressed as approximations by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus, specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural references unless the context clearly dictates otherwise. Thus, for example, reference to "a" component includes aspects having two or more such components, unless the context clearly indicates otherwise.

The word "exemplary," "example," or various forms thereof are used herein to mean serving as an example, instance, or illustration. Any aspect or design described herein as "exemplary" or as an "example" should not be construed as preferred or advantageous over other aspects or designs. Furthermore, examples are provided solely for purposes of clarity and understanding and are not meant to limit or restrict the disclosed subject matter or relevant portions of this disclosure in any manner. It can be appreciated that a myriad of additional or alternate examples of varying scope could have been presented, but have been omitted for purposes of brevity.

As used herein, the terms "comprising" and "including", and variations thereof, shall be construed as synonymous and open-ended, unless otherwise indicated. A list of elements following the transitional phrases comprising or including is a non-exclusive list, such that elements in addition to those specifically recited in the list may also be present.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the term "electrically connected," "electrically connecting," and variations thereof, mean connected by way of an electrical conductor not including a molten material (e.g., molten glass). A first element electrically connected to a second element can include additional elements between the first element and the second element such that the additional elements are also electrically connected to the first element and the second element. That is, a first element electrically connected to a second element is not to be construed as precluding the presence of additional elements in the connection. Typically, such electrical conductors comprise metallic wiring or cabling, buss bars, and the like, but are not limited thereto. The electrical connection may further include other components, including but not limited to electrical connectors (e.g., plugs, tabs, lugs, bolts, etc.) that facilitate connection between components, electrical control devices such as electrical current and/or voltage controllers, electrical current and/or voltage measurement devices, and the like.

As used herein, "refractory" refers to non-metallic materials having chemical and physical properties making them applicable for structures, or as components of systems, that are exposed to environments above 538° C.

Figure 1:
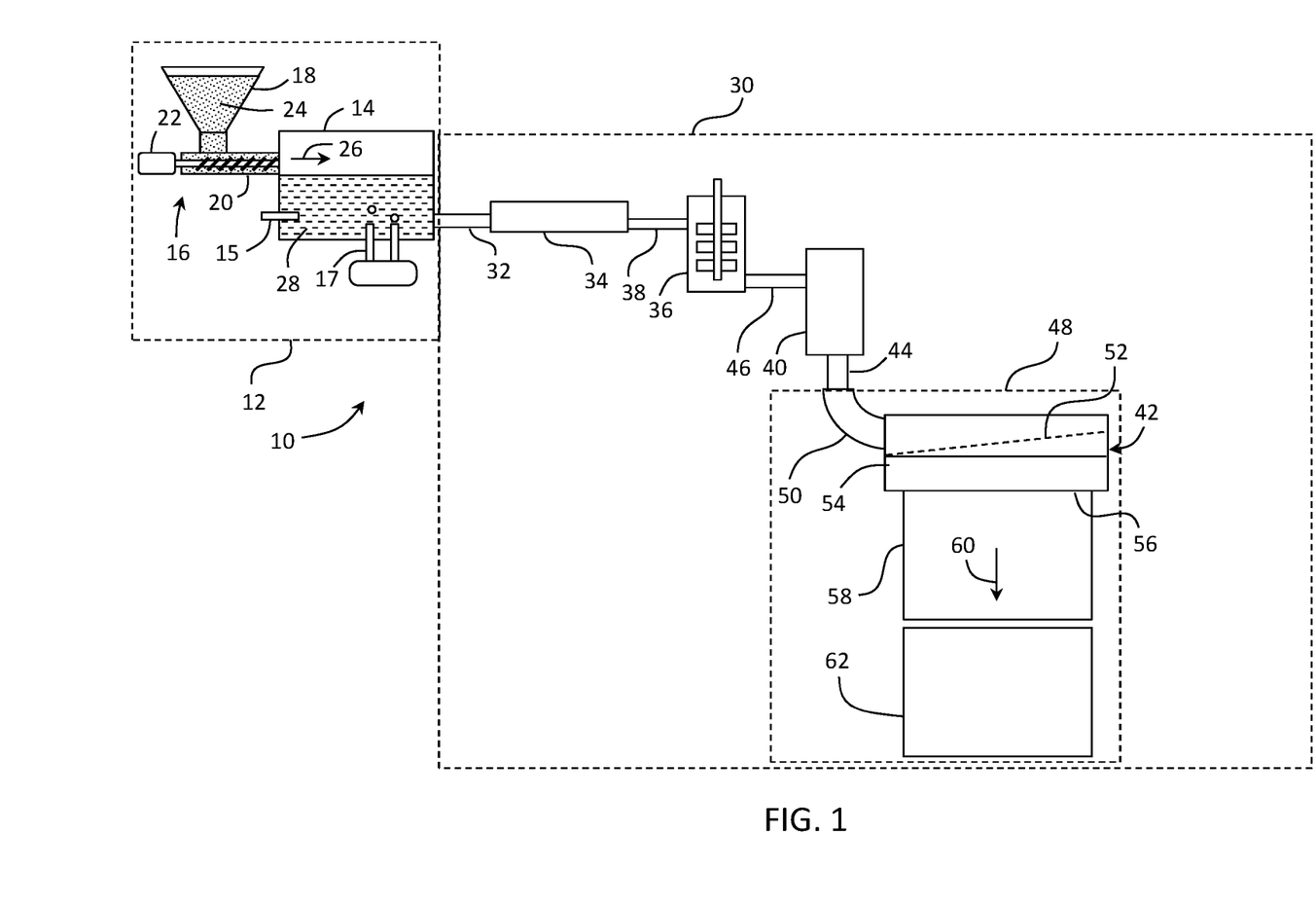
FIG. 1 is a schematic view of an exemplary glass manufacturing apparatus according to embodiments of the present disclosure.

Shown in FIG. 1 is an exemplary glass manufacturing apparatus 10. In some embodiments, the glass manufacturing apparatus 10 can comprise a glass melting furnace 12 including a melting vessel 14. In addition to melting vessel 14, glass melting furnace 12 can optionally include one or more additional components such as heating elements (e.g., combustion burners and/or electrodes) configured to heat raw material and convert the raw material into molten glass. For example, melting vessel 14 may be an electrically-boosted melting vessel, wherein energy is added to the raw material through both combustion burners and by direct heating, wherein an electrical current is passed through the raw material, the electrical current thereby adding energy via Joule heating of the raw material. In some embodiments, melting furnace 12 may include a forehearth (see FIG. 9) arranged to provide thermal conditioning to molten glass leaving melting vessel 14 and passing through the forehearth.

In further embodiments, glass melting furnace 12 can include other thermal management devices (e.g., insulation components) that reduce heat loss from the melting vessel. In still further embodiments, glass melting furnace 12 can include electronic and/or electromechanical devices that facilitate melting of the raw material into a glass melt. For example, glass melting furnace 12, and more specifically glass melting vessel 14, may include one or more thermocouples 15 that relay a temperature signal to temperature control apparatus. Typically, such thermocouples penetrating one or more walls of the melting vessel, and/or the bottom wall of the melting vessel, into the molten glass comprise platinum or a platinum alloy such as a platinum or platinum alloy sheath, to protect the thermocouple from corrosive effects of the molten glass. Still further, glass melting furnace 12 can include support structures (e.g., support chassis, support member, etc.) or other components. In some embodiments, melting vessel 14 may further include one or more bubbler tubes 17 in fluid communication with a source of gas, for example an inert gas such as nitrogen or one or more of the noble gases, or oxygen, or a combination of any of these gases, or any other suitable gas. Typically, such bubbler tubes comprise platinum or a platinum alloy such as, but not limited to, a platinum-rhodium alloy, and extend through the bottom wall of the melting vessel. Bubbling gas into the molten glass can assist with mixing the molten glass, adjusting a redox state of the molten glass, or may even assist with fining the molten glass by forming a bubble that other gasses in the molten glass can diffuse into.

Glass melting vessel 14 can be formed from a refractory material, such as a refractory ceramic material, for example a refractory ceramic material comprising alumina or zirconia, although the refractory ceramic material can comprise other refractory materials, such as yttrium (e.g., yttria, yttria-stabilized zirconia, yttrium phosphate), zircon (ZrSiO$_4$) or alumina-zirconia-silica or even chrome oxide, used either alternatively or in any combination. In some examples, glass melting vessel 14 may be constructed from refractory ceramic bricks.

In some embodiments, melting furnace 12 can be incorporated as a component of a glass manufacturing apparatus configured to fabricate a glass article, for example a glass ribbon of an indeterminate length, although in further embodiments, the glass manufacturing apparatus can be configured to form other glass articles without limitation, such as glass rods, glass tubes, glass envelopes (for example, glass envelopes for lighting devices, e.g., light bulbs) and glass lenses, although many other glass articles are contemplated. In some examples, the melting furnace may be included in a glass manufacturing apparatus comprising a slot draw apparatus, a float bath apparatus, a down-draw apparatus (e.g., a fusion down draw apparatus), an up-draw apparatus, a pressing apparatus, a rolling apparatus, a tube drawing apparatus or any other glass manufacturing apparatus that would benefit from the present disclosure. By way of example, FIG. 1 schematically illustrates glass melting furnace 12 as a component of a fusion down-draw glass manufacturing apparatus 10 for fusion drawing a glass ribbon for subsequent processing into individual glass sheets or rolling the glass ribbon onto a spool.

Glass manufacturing apparatus 10 can optionally include an upstream glass manufacturing apparatus 16 positioned upstream of glass melting vessel 14. In some examples, a portion of, or the entire upstream glass manufacturing apparatus 16, can be incorporated as part of the glass melting furnace 12.

As shown in the embodiment illustrated in FIG. 1, upstream glass manufacturing apparatus 16 can include a raw material storage bin 18, a raw material delivery device 20 and a motor 22 connected to raw material delivery device 20. Raw material storage bin 18 can be configured to store a quantity of raw material 24 that can be fed into melting vessel 14 of glass melting furnace 12 through one or more feed ports, as indicated by arrow 26. Raw material 24 typically comprises one or more glass forming metal oxides and one or more modifying agents. In some examples, raw material delivery device 20 can be powered by motor 22 to deliver a predetermined amount of raw material 24 from storage bin 18 to melting vessel 14. In further examples, motor 22 can power raw material delivery device 20 to introduce raw material 24 at a controlled rate based on a level of molten glass sensed downstream from melting vessel 14 relative to a flow direction of the molten glass. Raw material 24 within melting vessel 14 can thereafter be heated to form molten glass 28. Typically, in an initial melting step, raw material is added to the melting vessel as particulate, for example as various "sands". Raw material 24 can also include scrap glass (i.e. cullet) from previous melting and/or forming operations. Combustion burners are typically used to begin the melting process. In an electrically boosted melting process, once the electrical resistance of the raw material is sufficiently reduced, electric boost can begin by developing an electrical potential between electrodes positioned in contact with the raw material, thereby establishing an electrical current through the raw material, the raw material typically entering, or in, a molten state.

Glass manufacturing apparatus 10 can also optionally include a downstream glass manufacturing apparatus 30 positioned downstream of glass melting furnace 12 relative to a flow direction of molten glass 28. In some examples, a portion of downstream glass manufacturing apparatus 30 may be incorporated as part of glass melting furnace 12. However, in some instances, first connecting conduit 32 discussed below, or other portions of the downstream glass manufacturing apparatus 30, can be incorporated as part of the glass melting furnace 12.

Downstream glass manufacturing apparatus 30 can include a first conditioning (i.e. processing) chamber, such as fining vessel 34, located downstream from melting vessel 14 and coupled to melting vessel 14 by way of the above-referenced first connecting conduit 32. In some examples, molten glass 28 may be gravity fed from melting vessel 14 to fining vessel 34 by way of first connecting conduit 32. For instance, gravity may drive molten glass 28 through an interior pathway of first connecting conduit 32 from melting vessel 14 to fining vessel 34. Accordingly, first connecting conduit 32 provides a flow path for molten glass 28 from melting vessel 14 to fining vessel 34. It should be understood, however, that other conditioning chambers may be positioned downstream of melting vessel 14, for example between melting vessel 14 and fining vessel 34. In some embodiments, a conditioning chamber can be employed between the melting vessel and the fining chamber. For example, molten glass from a primary melting vessel can be further heated in a secondary melting (conditioning) vessel, or cooled in the secondary melting vessel to a temperature lower than the temperature of the molten glass in the primary melting vessel before entering the fining chamber.

As described previously, bubbles may be removed from molten glass 28 by various techniques. For example, raw material 24 may include multivalent compounds (i.e. fining agents) such as tin oxide that, when heated, undergo a chemical reduction reaction and release oxygen. Other suitable fining agents include without limitation arsenic, antimony, iron and cerium, although the use of arsenic and antimony may be discouraged for environmental reasons in some applications. Fining vessel 34 is heated, for example to a temperature greater than the melting vessel temperature, thereby heating the fining agent. Oxygen bubbles produced by the temperature-induced chemical reduction of one or more fining agents included in the molten glass rise through the molten glass within the fining vessel, wherein gases in the molten glass produced in the melting furnace can coalesce or diffuse into the oxygen bubbles produced by the fining agent. The enlarged gas bubbles with increased buoyancy can then rise to a free surface of the molten glass within the fining vessel and thereafter be vented out of the fining vessel. The oxygen bubbles can further induce mechanical mixing of the molten glass in the fining vessel as they rise through the molten glass.

The downstream glass manufacturing apparatus 30 can further include another conditioning chamber, such as mixing apparatus 36, for example a stirring chamber, for mixing the molten glass that flows downstream from fining vessel 34. Mixing apparatus 36 can be used to provide a homogenous glass melt composition, thereby reducing chemical or thermal inhomogeneities that may otherwise exist within the molten glass exiting the fining chamber. As shown, fining vessel 34 may be coupled to mixing apparatus 36 by way of a second connecting conduit 38. In some embodiments, molten glass 28 can be gravity fed from the fining vessel 34 to mixing apparatus 36 by way of second connecting conduit 38. For instance, gravity may drive molten glass 28 through an interior pathway of second connecting conduit 38 from fining vessel 34 to mixing apparatus 36. Typically, the molten glass within mixing apparatus 36 includes a free surface, with a free volume extending between the free surface and a top of the mixing apparatus. It should be noted that while mixing apparatus 36 is shown downstream of fining vessel 34 relative to a flow direction of the molten glass, mixing apparatus 36 may be positioned upstream from fining vessel 34 in other embodiments. In some embodiments, downstream glass manufacturing apparatus 30 may include multiple mixing apparatus, for example a mixing apparatus upstream from fining vessel 34 and a mixing apparatus downstream from fining vessel 34. These multiple mixing apparatus may be of the same design, or they may be of a different design from one another. In some embodiments, one or more of the vessels and/or conduits can include static mixing vanes positioned therein to promote mixing and subsequent homogenization of the molten material.

Downstream glass manufacturing apparatus 30 can further include another conditioning chamber such as delivery vessel 40 located downstream from mixing apparatus 36. Delivery chamber 40 can condition molten glass 28 to be fed into a downstream forming device. For instance, delivery chamber 40 can act as an accumulator and/or flow controller to adjust and provide a consistent flow of molten glass 28 to forming body 42 by way of exit conduit 44. The molten glass within delivery chamber 40 can, in some embodiments, include a free surface, wherein a free volume extends upward from the free surface to a top of the delivery chamber. As shown, mixing apparatus 36 can be coupled to delivery chamber 40 by way of third connecting conduit 46. In some examples, molten glass 28 can be gravity fed from mixing apparatus 36 to delivery vessel 40 by way of third connecting conduit 46. For instance, gravity can drive molten glass 28 through an interior pathway of third connecting conduit 46 from mixing apparatus 36 to delivery chamber 40.

Downstream glass manufacturing apparatus 30 can further include forming apparatus 48 comprising the above-referenced forming body 42, including inlet conduit 50. Exit conduit 44 can be positioned to deliver molten glass 28 from delivery vessel 40 to inlet conduit 50 of forming apparatus 48. Forming body 42 in a fusion down-draw glass making apparatus can comprise a trough 52 positioned in an upper surface of the forming body, and converging forming surfaces 54 (only one surface shown) that converge in a draw direction along a bottom edge (root) 56 of the forming body. Molten glass delivered to forming body trough 52 via delivery vessel 40, exit conduit 44 and inlet conduit 50 overflows the walls of trough 52 and descends along the converging forming surfaces 54 as separate flows of molten glass. The separate flows of molten glass join below and along the root 56 to produce a single ribbon 58 of molten glass that is drawn along a draw plane in a draw direction 60 from root 56 by applying a downward tension to the glass ribbon, such as by gravity and/or pulling roll assemblies (not shown), to control the dimensions of the glass ribbon as the molten glass cools and a viscosity of the material increases. Accordingly, glass ribbon 58 goes through a visco-elastic transition to an elastic state and acquires mechanical properties that give glass ribbon 58 stable dimensional characteristics. Glass ribbon 58 may in some embodiments be separated into individual glass sheets 62 by a glass separation apparatus (not shown), while in further embodiments, the glass ribbon may be wound onto spools and stored for further processing.

Components of downstream glass manufacturing apparatus 30, including any one or more of connecting conduits 32, 38, 46, fining vessel 34, mixing apparatus 36, delivery vessel 40, exit conduit 44, or inlet conduit 50 may be formed from a precious metal. Suitable precious metals include platinum group metals selected from the group consisting of platinum, iridium, rhodium, osmium, ruthenium and palladium, or alloys thereof. For example, downstream components of the glass manufacturing apparatus may be formed from a platinum-rhodium alloy including from about 70% to about 90% by weight platinum and about 10% to about 30% by weight rhodium. However, other suitable metals for forming downstream components of the glass manufacturing apparatus can include molybdenum, rhenium, tantalum, titanium, tungsten and alloys thereof.

Although elements of the glass making apparatus 10 are shown and described as fusion downdraw glass making elements, principles of the present disclosure can be applied to a wide variety of glass making processes. For example, melting vessels according to embodiments of the present disclosure can be used in such diverse glass making processes as fusion processes, slot draw processes, rolling processes, pressing processes, float processes, tube drawing processes, and so forth.

Figure 2A:
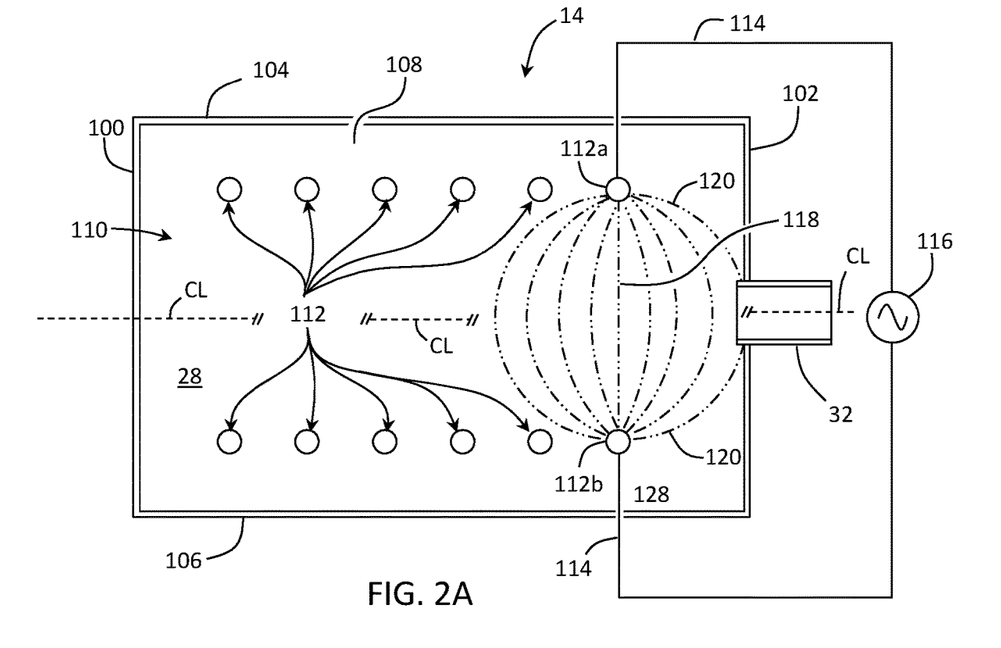
FIG. 2A is a plan view of an exemplary melting vessel that can be used in the apparatus of FIG. 1, illustrating placement of powered electrodes relative to a connecting conduit of the melting vessel according to an embodiment of the disclosure.

Turning to FIG. 2A, a plan view of an exemplary refractory melting vessel 14 is shown (not to scale) comprising at least one side wall and a bottom wall. Melting vessel 14 may further comprise a ceiling (e.g., crown). In some embodiments, the at least one side wall can comprise multiple side walls, for example arranged in the shape of a polygon with a polygonal footprint, for example a rectangle as shown in FIG. 2A, although in further embodiments, the at least one side wall may be a single side wall and form a circular, elliptical, or other curved footprint. For discussion and not limitation, the exemplary melting vessel 14 of FIG. 1, with a rectangular footprint, will be described in more detail, with the understanding the following description is equally applicable to other melting vessel shapes.

As shown in FIG. 2A, exemplary melting vessel 14 comprises back wall 100, front wall 102, first and second side walls 104, 106, a bottom wall (e.g., floor) 108, and a ceiling, hereinafter crown 109, extending between the back, front and sidewalls and over the bottom wall. The back wall, front wall, side walls and bottom wall define an interior space 110, for example a melting space for processing batch material 24 into molten material 28 (hereinafter, molten glass). Melting vessel 14 may further comprise first connecting conduit 32 extending through front wall 102 through which molten glass 28 can flow from melting space 110 to downstream processes. Melting vessel 14 may still further comprise a plurality of electrodes 112 extending through bottom wall 108 into melting space 110, although in further embodiments, the plurality of electrodes 112 can be exposed to, and in some embodiments, extend into, melting space 110 through first and second side walls 104, 106, or even through crown 109. The plurality of electrodes 112 can comprise, for example, molybdenum (e.g., Mo or $MoZrO_2$) or tin (e.g., tin oxide), and can be formed as rods, blocks, plates, or other suitable shapes, depending on placement and operation.

In various embodiments, the plurality of electrodes 112 can be positioned in electrode holders (not shown) that provide for movement of the electrodes. For example, over time the electrodes can be reduced in length due to erosion, corrosion, and dissolution in the hot molten glass. Accordingly, from time to time the electrodes may need to be "pushed", thereby extending the length of the electrode exposed to the molten glass to a predetermined value. The electrode holders may further provide cooling of the electrode. Cooling of the electrodes can, for example, increase the longevity of the electrodes. In addition, in some embodiments, a gap between an electrode holder and the electrode can fill with molten glass. Cooling increases a viscosity of the molten glass in the gap, thereby forming a glass seal that can preventing leakage of molten glass from the melting vessel through the gap, and can further form effective electrical isolation between the electrode and the refractory wall through which the electrode passes. The electrode can be moved (e.g., "pushed"), by reducing cooling so the glass in the gap becomes molten again (viscosity reduced), moving the electrode, then increasing the cooling to reform the glass seal in the gap.

The plurality of electrodes 112 can be electrically connected to one or more electrical power supplies, for example alternating current electrical power supplies, forming one or more electrical circuits for establishing an electrical current through molten glass 28. For example, the plurality of electrodes 112 can be arranged as pairs of electrodes in a predetermined electrical circuit, wherein one electrode of the pair of electrodes in the electrical circuit is positioned on one side of melting vessel 14 (one side of centerline CL) and the other electrode of the pair of electrodes in the electrical circuit is positioned on the opposite side of melting vessel 14 (opposite side of centerline CL), the pair of electrodes powered by an electrical power supply electrically connected thereto. However, the plurality of electrodes can be configured in other arrangements, wherein a predetermined electrical circuit can comprise more than two electrodes, for example three electrodes, four electrodes, or more. An electrical power supply electrically connected to the electrodes in a predetermined electrical circuit, for example a pair of electrodes, establishes an electrical current in the molten glass between the electrodes. The predetermined electrical circuit can comprise additional elements, including but not limited to electrical connectors (e.g., plugs, tabs, lugs, bolts, etc.) that facilitate electrical connection between components, electrical control devices such as electrical current and/or voltage controllers, electrical current and/or voltage measurement devices, and the like. The plurality of electrodes 112 are hereinafter referred to as "powered electrodes", meaning the plurality of electrodes are electrically connected to one or more electrical power supplies, for example through suitable electrical conductors (cables, bus bars, or the like). When powered by an electrical power supply, the electrical current is said to "fire" across the molten glass between the pair of electrodes (i.e., an electrical current is established between the opposing electrodes). Multiple such electrical circuits, including two or more powered electrodes each, can be established in the melting vessel. One such electrical circuit is shown in FIG. 2, wherein a pair of powered electrodes 112a and 112b closest to connecting conduit 32 are electrically connected by electrical conductors 114 to power supply 116. As described above, the connection between the powered electrodes and the power supply may further comprise other elements, including but not limited to electrical connectors (e.g., plugs, tabs, lugs, bolts, etc.) that facilitate connection between the various electrical components, electrical control devices such as electrical current and/or voltage controllers, electrical current and/or voltage measurement devices, and the like. Accordingly, an electrical current is established through molten glass 28 between powered electrodes 112a and 112b which, owing to the electrical resistance of the molten glass, generates heat within molten glass 28.

For purposes of discussion and not limitation, electrical current paths that extend entirely through molten glass 28 between powered electrodes 112a and 112b will be represented by the straight-line electrical current path 118 (first electrical current path 118) between powered electrodes 112a and 112b, with the understanding that additional electrical current paths between powered electrodes 112a and 112b that extend solely through the molten glass and do not intersect other conductors also exist. Likewise, there are other electrical current paths extending between powered electrodes 112a and 112b that intersect, and extend through, other electrical conductors in the molten glass. As described herein, these other electrical conductors can be metallic conductors, and specifically precious metal components such as conduits, bubbler tubes, thermocouple components, etc. Such electrical current paths intersecting a precious metal component are represented by electrical current path 120 (second electrical current path 120).

As shown in FIG. 2A, second electrical current path 120 extending between first and second powered electrodes 112a and 112b intersects with and extends through connecting conduit 32. Accordingly, the electrical current in first and second electrodes 112a and 112b is divided between first electrical current path 118 and second electrical current path 120 according to the individual resistances of the electrical current paths, since first electrical current path 118 and second electrical current path 120 represent parallel electrical current paths. That is, if the resistance of the first electrical current path is R1 and the resistance of the parallel second electrical current path is R2, and i represents the total current (e.g., the total current in either one of the powered electrodes 112a or 112b), i1 represent the electrical current in the first electrical current path 118 and i2 represents the electrical current in the second electrical current path 120, then i1=(R2/(R1+R2))·i and i2=(R1/(R1+R2))·i.

As described above, in various embodiments, first connecting conduit 32 can comprise a precious metal, for example platinum or a platinum alloy such as a platinum-rhodium alloy. While generally electrically conductive at a melting temperature of the molten glass, molten glass 28 occupying melting space 110 can still exhibit a substantial electrical resistance compared to first connecting conduit 32. Thus, the electrical current extending through connecting conduit 32 can be significant, and if the electrical current in connecting conduit 32 comprises sufficient magnitude (e.g., comprises a significantly large current density), electrochemical attack on connecting conduit 32 can occur, thereby potentially releasing gas into the molten glass, or causing more substantial material breakdown of the conduit metal. For some glasses and melt conditions, electrical current densities as low as 1 ampere per square inch (0.16 ampere per square cm) of surface area firing through precious metal can attack the precious metal and generate gases that form inclusions (seeds) in the molten glass. Other glass and melt conditions may produce defects at even lower current densities depending on composition and temperature.

To mitigate this division of electrical current between a powered electrode-to-powered electrode electrical current path (first electrical current path 118), and an electrode-metallic component-electrode electrical current path (e.g., second electrical current path 120), one or more non-powered electrodes 122 can be positioned proximate the first connecting conduit, wherein the one or more non-powered electrodes provide a third electrical current path parallel to the first and second electrical current paths. As used herein, the term "non-powered electrode" refers to an electrode that is not itself intentionally part of an electrical circuit used to heat the molten glass within the fining vessel and is not connected, such as by metallic conductors, to a power supply. That is, a non-powered electrode is not electrically connected to an electrical power source.

Figure 2B:
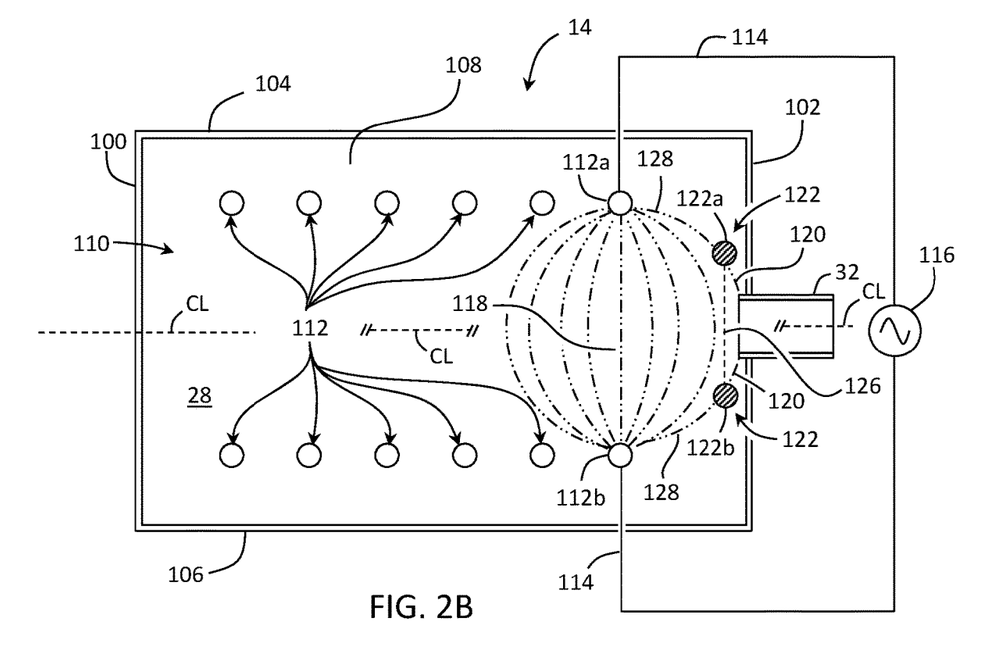
FIG. 2B is a plan view of the exemplary melting vessel of FIG. 2A illustrating placement of powered and non-powered electrodes relative to a connecting conduit of the melting vessel according to an embodiment of the disclosure.
Figure 2C:
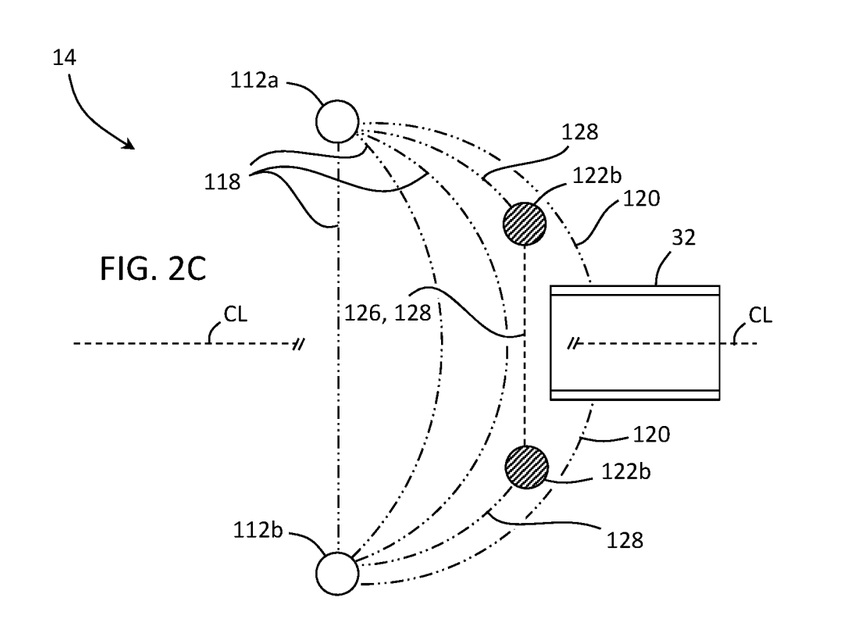
FIG. 2C is a close-up view of a [portion of FIG. 2B showing the various parallel electrical current paths.

FIG. 2B depicts another embodiment of melting vessel 14 comprising a first non-powered electrode 122a positioned proximate one side of connecting conduit 32 and a second non-powered electrode 122b positioned proximate the opposite side of connecting conduit 32. First and second non-powered electrodes 122a, 122b are electrically connected by electrical conductor 126 (shown as a dashed line in FIG. 2B), which comprises third electrical current path 128 extending from first powered electrode 112a through first and second non-powered electrodes 122a, 122b, and metallic conductor 126, to second powered electrode 112b. FIG. 2C is a close-up view of a portion of FIG. 2B illustrating the various electrical current paths. FIG. 2C makes clear that second electrical current path 120 does not extend between first non-powered electrode 122a and connecting conduit 32, nor between second non-powered electrode 122b and connecting conduit 32, because the resistance of non-powered electrodes 122a, 122b and electrical conductor 126 are significantly less than the intervening molten glass between the non-powered electrodes 122a, 122b and connecting conduit 32. FIG. 2C is further applicable to the other embodiments disclosed herein.

Electrical conductor 126 can be, for example, a cable, bus bar or other suitable low-resistance conductor (with an electrical resistance lower than the electrical resistance of the molten glass). For example, first and second non-powered electrodes 122a, 122b can extend through bottom wall 108, such that end portions of the non-powered electrodes extend outside interior space 110. Electrical conductor 126 can then be electrically connected to the end portions of the non-powered electrodes outside the melting space (e.g., below bottom wall 108) and not in contact with molten glass 28, thereby forming a low electrical resistance link (relative to the electrical resistance of the molten glass) between the non-powered electrodes. In further embodiments, the non-powered electrodes 122a, 122b can extend through a wall of the melting vessel, such as through front wall 102 (see FIG. 4), wherein electrical conductor 126 can again be electrically connected to ends of the non-powered electrodes not exposed to interior space 110 (e.g., molten glass 28).

Because third electrical current path 128 extending from powered electrode 112a to non-powered electrode 122a through molten glass 28, and then through electrical conductor 126 to non-powered electrode 122b and again through molten glass 28 to second powered electrode 112b can be selected to have a third electrical resistance less than the second electrical resistance of second electrical current path 120, at least a portion of the electrical current that might otherwise be established in second electrical current path 120 passes through parallel third electrical current path 128, thereby reducing the electrical current in connecting conduit 32. To wit, first, second and third electrical current paths 118, 120, and 128 represent parallel resistances, and the electrical current through powered electrodes 112a and 112b is divided between the parallel electrical current paths according to their respective resistances in accordance with well-known principles for parallel resistances.

Figure 4:
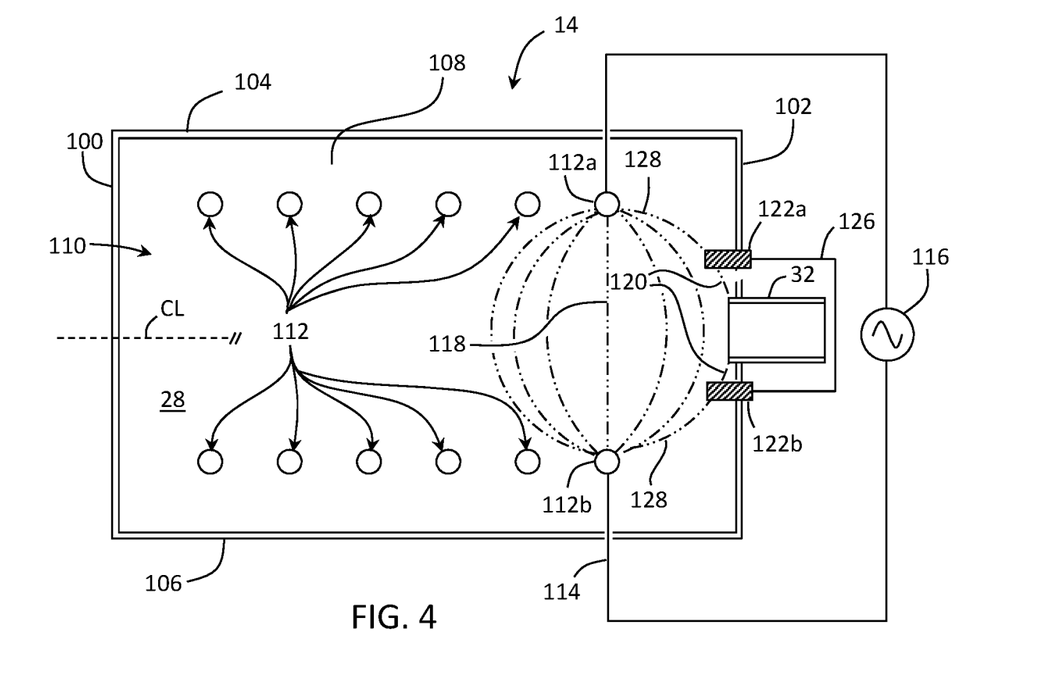
FIG. 4 is a plan view of another exemplary melting vessel that can be used in the apparatus of FIG. 1, illustrating placement of powered and non-powered electrodes relative to a connecting conduit of the melting vessel according to another embodiment of the disclosure

Those of ordinary skill in the art will recognize that third electrical current path 128 can reduce the electrical current in first electrical current path 118. However, the electrical current in second electrical current path 120 can also be reduced. A position for non-powered electrodes 122a and 122b can be selected that reduces the electrical current in connecting conduit 32 to a value that minimizes undesirable electrochemical reactions in the connecting conduit while also minimizing the amount of electrical current drawn away from first electrical current path 118, since the electrical resistance of an electrical current path is due at least in part on the length of the electrical current path. Placement of the non-powered electrodes may further depend at least in part on the geometry of the melting vessel, the position of the powered electrodes (and the proximity of the powered electrodes to the precious metal component, e.g., connecting conduit), the geometry of the precious metal component, the geometry and material of the non-powered electrodes, the conductivity of the molten glass, and the magnitude of electrical potential between the powered electrodes (e.g., voltage between powered electrodes 112a and 112b). Typically, the non-powered electrode(s) are positioned closer to the precious metal component, e.g., connecting conduit 32, than the powered electrodes closest to the precious metal component. FIG. 4 is a plan view showing a pair of non-powered electrodes 122a, 122b extending through front wall 102 into molten glass 28 proximate connecting conduit 32.

Figure 3:
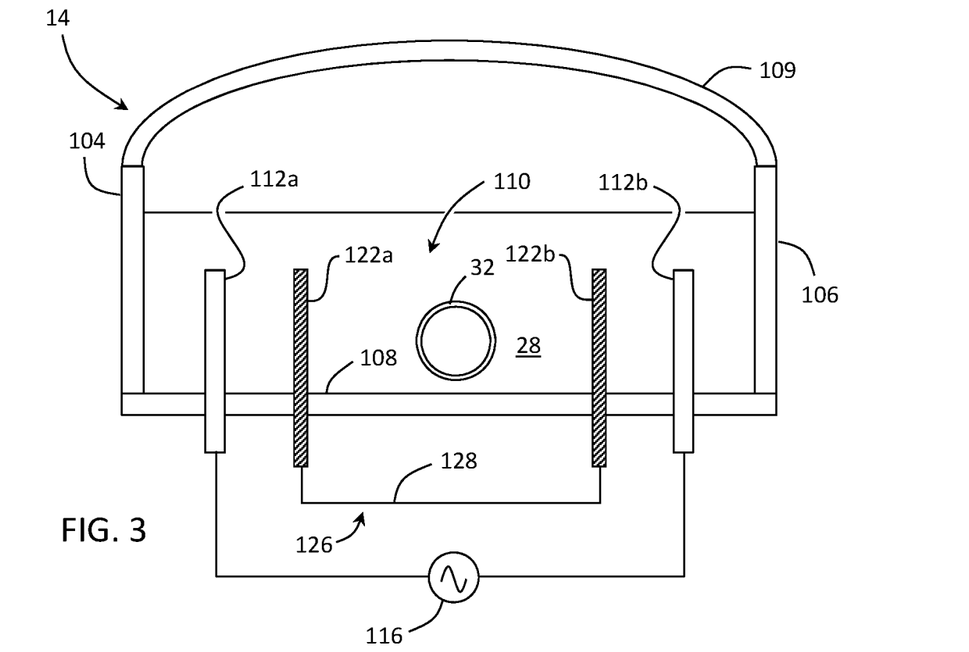
FIG. 3 is a lateral cross-sectional view of FIG. 2B further illustrating placement of the powered and non-powered electrodes.
Figure 5:
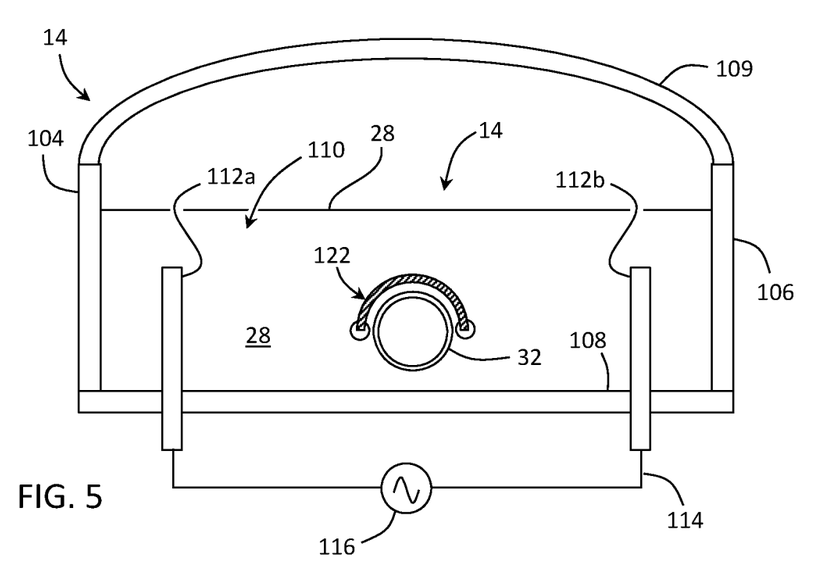
FIG. 5 is a lateral cross-sectional view of still another exemplary melting vessel that can be used in the apparatus of FIG. 1 showing an arc-shaped non-powered electrode.

It should be apparent with the benefit of the present disclosure that while the embodiments of FIGS. 2-4 comprise two non-powered electrodes arranged proximate connecting conduit 32, the same effect can be achieved with a single non-powered electrode of appropriate shape. That is, non-powered electrodes 122a, 122b and electrical conductor 126 represent a single, low-resistance electrical current path for which a single conductor (e.g., non-powered electrode) can be substituted, the single conductor extending within the molten glass from one side of the connecting conduit to the opposing side of the conduit so electrical current in the connecting conduit can be reduced (e.g., so at least a portion of the electrical current that would otherwise pass through the connecting conduit instead passes through the non-powered electrode). For example, FIG. 5 depicts another embodiment of melting vessel 14 wherein a non-powered electrode 122 extends from one side of connecting conduit 32 to the opposite side of connecting conduit 32. Although FIG. 5 shows non-powered electrode 122 anchored in front wall 102 of melting vessel 14, in other embodiments, non-powered electrode 122 can be anchored in bottom wall 108 (see FIG. 7).

Figure 6:
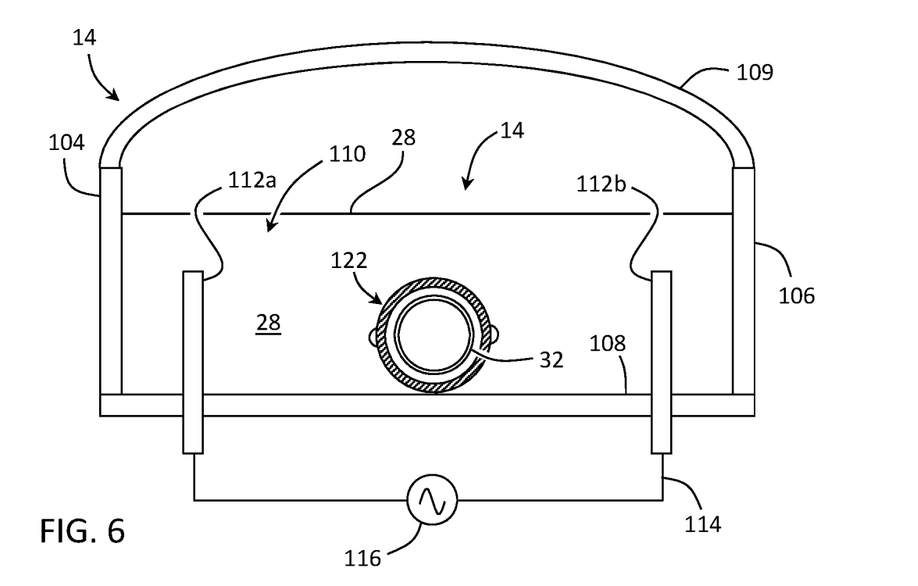
FIG. 6 is a lateral cross-sectional view of yet another exemplary melting vessel that can be used in the apparatus of FIG. 1 showing a circularly-shaped non-powered electrode.
Figure 7:
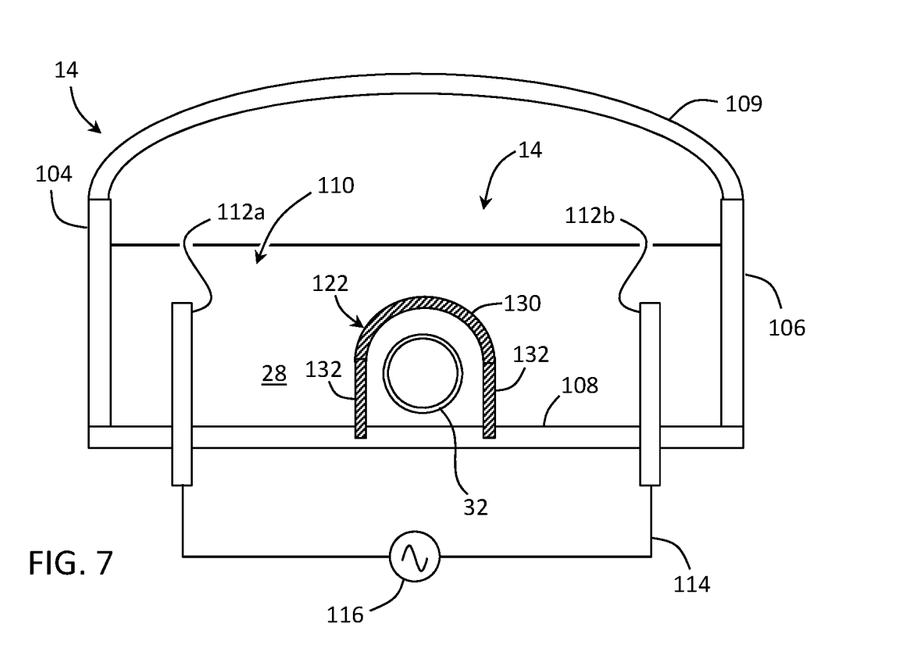
FIG. 7 is a lateral cross-sectional view of another exemplary melting vessel that can be used in the apparatus of FIG. 1 showing another a non-powered electrode comprising straight portions and a curved portion.

In some embodiments, one or more non-powered electrodes 122 can comprise an arc as shown in FIG. 5, or be circular as shown in FIG. 6. The one or more non-powered electrodes 122 can assume a variety of shapes provided the non-powered electrodes provide a parallel electrical current path to the electrical current path comprising the precious metal component, thereby shunting electrical current from the precious metal component, e.g., connecting conduit 32. For example, FIG. 7 illustrates a non-powered electrode comprising both a curved portion 130 and straight portions 132.

The one or more non-powered electrodes 122 can be formed from the same material as the powered electrodes 112. For example, the one or more non-powered electrodes can comprise molybdenum (e.g., Mo or $MoZrO_2$) or tin (e.g., tin oxide). Like the material used for the plurality of powered electrodes 112, the material of the non-powered electrodes should be compatible with the molten glass composition. Typically, this means that as the electrode (powered or non-powered), decomposes in the molten glass, the decomposed electrode material should be benign with respect to the properties of the glass, or form a desirable portion of the glass composition. For example, tin oxide is typically added to the batch material as a fining agent for display-type glasses (glass destined for use in the manufacture of glass display panels) owing to its relative non-toxicity compared to other possible fining agents (e.g., arsenic or antimony). Thus, the small amount of tin oxide added to the molten glass by decomposition of tin oxide electrodes may be beneficial as a fining agent. However, tin oxide as an electrode material is more expensive than molybdenum. Other materials may be substituted provided they are compatible with the molten glass.

It should be further apparent that the principles described above can be used to prevent electrochemical reactions with other precious metal components that may be exposed to the molten glass in the melting vessel. For example, thermocouples containing platinum can extend into the molten glass, as can bubbler tubes extending into the molten glass and configured to intentionally release oxygen or other gases into the molten glass in a bubbling process. Oxygen bubbling can be used, for example, to vary an oxidation state of the molten glass. Precious metal-containing bubbler tubes, for example platinum-containing bubbler tubes, can extend from a bottom wall of the melting vessel, and, like connecting conduit 32, if positioned near a powered electrode electrical current path, can provide an alternative or additional electrical current path, wherein an electrical current in the electrical current path provided by the precious metal component causes an electrochemical breakdown of the precious metal. Thus, one or more non-powered electrodes can be positioned near a thermocouple or near a bubbler tube, or near any other precious metal component positioned in the molten glass contained within melting space 110 that provides a parallel electrical current path to the electrical current path comprising the precious metal component.

Figure 8:
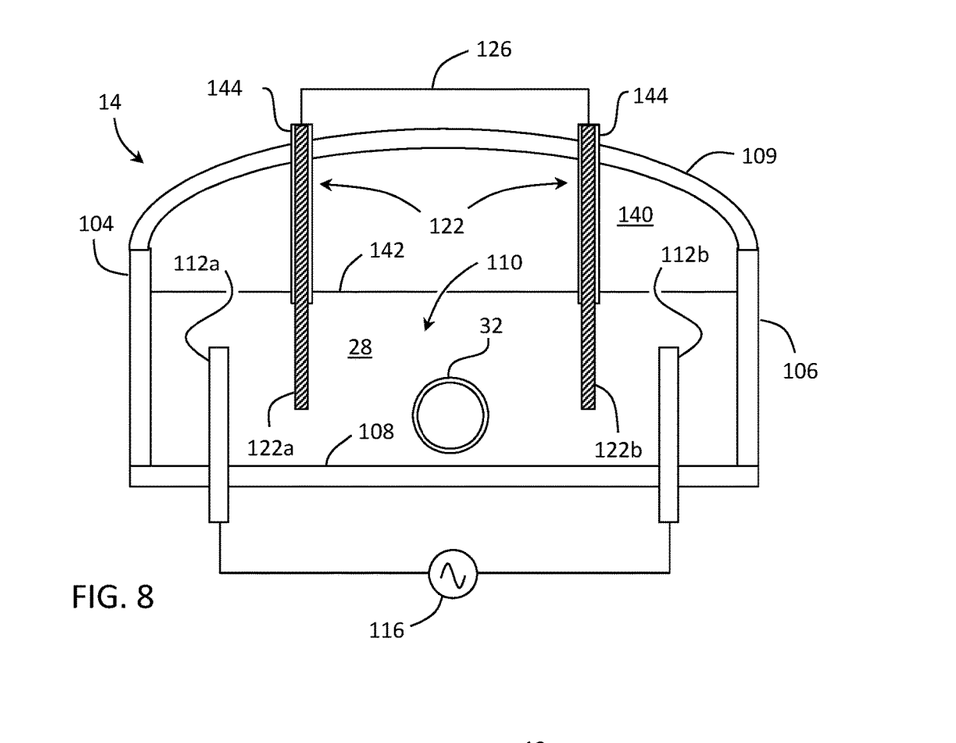
FIG. 8 is a lateral cross-sectional view of still another exemplary melting vessel that can be used in the apparatus of FIG. 1 showing non-powered electrodes extending into molten glass contained therein from a ceiling of the melting vessel.

FIG. 8 illustrates other embodiments wherein the one or more non-powered electrodes 122 (e.g., non-powered electrodes 122a, 122b) extend into molten glass 28 through crown 109. While non-powered electrodes 122a, 122b extending through crown 109 are shown connected by electrical conductor 126 in the form of a wire (cable) or bus bar, in other embodiments electrical conductor 126 could be formed of the same material as non-powered electrodes 122a, 122b. Owning to the potential for rapid decomposition of some electrode materials (e.g., molybdenum) in the presence of oxygen in melting vessel atmosphere 140 overtop free surface 142 of molten glass 28, in some embodiments, non-powered electrodes 122 may comprise a cladding layer 144 positioned on an exterior surface of the electrodes and extending over at least that portion of the non-powered electrodes exposed to melting vessel atmosphere 140. Cladding layer 144 may comprise a precious metal, such as a platinum group metal (e.g., platinum, rhodium, palladium, ruthenium, iridium, osmium, or alloys thereof). While a small portion of cladding layer 144 may be in contact with molten glass 28 through free surface 142 to account for level variations of the molten glass in melting vessel 14 and assure no resultant exposure of the non-powered electrode material to the melting vessel atmosphere, the surface area of cladding layer 144 exposed to the melting vessel atmosphere is small, and not in a direct line between opposing powered electrodes 112a, 112b, nor between powered electrodes 112a, 112b and connecting conduit 32. Accordingly, the magnitude of electrical current in cladding layer 144 is expected to be insignificant (not produce a relevant electrochemical reaction).

Figure 9:
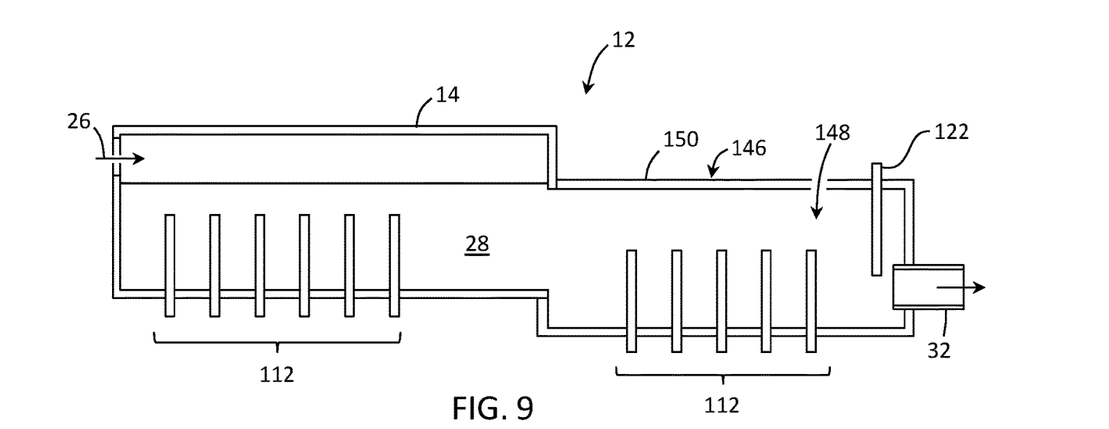
FIG. 9 is a longitudinal cross-sectional view of an exemplary melting furnace comprising a forehearth downstream from the melting vessel, the forehearth comprising powered and non-powered electrodes according to embodiments of the present disclosure.

While the foregoing discussion used a fusion downdraw glass making apparatus and process, including a refractory melting vessel, to illustrate aspects of the disclosure, in further embodiments, the glass making apparatus may include other refractory vessels comprising both powered and non-powered electrodes. For example, as shown in FIG. 9, melting furnace 12 may comprise a refractory forehearth 146 located downstream from melting vessel 14, wherein molten glass from melting vessel 14 is directed to the forehearth for thermal conditioning. Forehearth 146 may include powered electrodes 122, for example extending from and/or through the bottom wall and/or side walls of the forehearth into an interior space 148 configured to receive a flow of molten glass from melting vessel 14, and further including one or more non-powered electrodes 122 extending into molten glass 28 and arranged to establish an electrical current path parallel to the electrical current path comprising the precious metal component, e.g., connecting conduit 32, that may be in contact with the molten glass in the forehearth. Thus, the parallel electrical current path provided by the one or more non-powered electrodes draws electrical current from the electrical current path comprising the precious metal component. For example, forehearth 146 may include thermocouples including precious metal parts. The one or more non-powered electrodes 122 may be arranged in any of the previously described configurations, including, for example, extending through a ceiling 150 of forehearth 146 as shown in FIG. 9. Advantageously, providing non-powered electrodes extending through the ceiling of the forehearth (or the melting vessel), facilitates easy replacement compared to removing a non-powered electrode through a bottom wall and contending with molten glass flow through the passage from which the non-powered electrode was removed. In some embodiments where the forehearth is not operated as a submerged forehearth (where the molten glass does not completely fill the forehearth), the at least one non-powered electrode may comprise a cladding layer, for example a precious metal cladding layer, wherein the cladding layer is disposed over that portion of the non-powered electrode in contact with an atmosphere in the forehearth above the molten glass.

In still other embodiments, the refractory vessel may comprise a refractory fining vessel configured similar to a melting vessel and/or forehearth with powered electrodes for heating molten glass in the refractory fining vessel, and non-powered electrodes arranged to shunt an electric current produced by the powered electrodes from the precious metal component, thereby reducing electrical current in the precious metal component.

It will be apparent to those skilled in the art that various modifications and variations can be made to embodiments of the present disclosure without departing from the spirit and scope of the disclosure. Thus, it is intended that the present disclosure cover such modifications and variations provided they come within the scope of the appended claims and their equivalents.

What is claimed is:

1. A method for forming a glass article, comprising:
  establishing a first electrical current along a first electrical current path between a plurality of powered electrodes in a melting space of a melting vessel, the melting space comprising molten glass and a precious metal component in contact with the molten glass, the first electrical current path extending through the molten glass and not the precious metal component;
  establishing a second electrical current along a second electrical current path in the molten glass between the plurality of powered electrodes, at least a portion of the second electrical current path in parallel with at least a portion of the first electrical current path and comprising the precious metal component; and
  establishing a third electrical current along a third electrical current path in the molten glass between the plurality of powered electrodes, at least a portion of the third electrical current path comprising at least one non-powered electrode proximate the precious metal component such that at least a portion of the third electrical current path is in parallel with the second electrical current path.

2. The method according to claim 1, wherein the precious metal component comprises platinum.

3. The method according to claim 1, wherein the precious metal component comprises at least one of a thermocouple, a bubbler tube, or a conduit configured as a flow path for the molten glass.

4. The method according to claim 1, wherein the at least one non-powered electrode comprises molybdenum or tin.

5. The method according to claim 1, wherein the at least one non-powered electrode comprises at least two non-powered electrodes, the at least two non-powered electrodes connected by an electrical conductor not in contact with the molten glass.

6. The method according to claim 1, further comprising drawing the molten glass from a forming body to produce the glass article.

7. The method according to claim 6, wherein the glass article comprises a glass ribbon.

8. The method according to claim 1, wherein the establishing the third electrical current along the third electrical current path reduces the second electrical current.

9. An apparatus for forming a glass article, comprising:
a refractory vessel defining a melting space interior to the refractory vessel;
a plurality of powered electrodes positioned in the melting space, the plurality of powered electrodes electrically connected to an electrical power supply;
a precious metal component at least partially positioned in the melting space, the precious metal component not electrically connected to the electrical power supply;
at least one non-powered electrode positioned in the interior space proximate the precious metal component, the at least one non-powered electrode not electrically connected to the electrical power supply; and
a quantity of molten glass contained within the melting space and in contact with the plurality of powered electrodes, the precious metal component and the at least one non-powered electrode,
wherein the plurality of powered electrodes define a first electrical current path through the molten glass, the plurality of powered electrodes and the precious metal component define a second electrical current path through the molten glass in parallel with the first electrical current path, and the plurality of powered electrodes and the at least one non-powered electrode define a third electrical current path through the molten glass in parallel with the second electrical current path.

10. The apparatus according to claim 9, wherein the at least one non-powered electrode comprises molybdenum or tin.

11. The apparatus according to claim 9, wherein the precious metal component comprises at least one of a bubbler tube, a thermocouple, or a conduit configured as a flow path for molten glass.

12. An apparatus for forming a glass article, comprising:
a refractory vessel defining a space interior to the refractory vessel;
a plurality of powered electrodes exposed to the interior space;
an electrical power supply electrically connected to the powered electrodes, the plurality of powered electrodes and the electrical power supply comprising a first electrical current path;
a precious metal component exposed to the interior space, the precious metal component, the electrical power supply and the plurality of powered electrodes comprising a second electrical current path, wherein at least a portion of the second electrical current path is parallel to at least a portion of the first electrical current path; and
at least one non-powered electrode positioned in the interior space proximate the precious metal component, the at least one non-powered electrode, the electrical power supply and the plurality of powered electrodes comprising a third electrical current path, at least a portion of the third electrical current path parallel with the at least a portion of the second electrical current path.

13. The apparatus according to claim 12, wherein the at least one non-powered electrode comprises a plurality of non-powered electrodes extending into the interior space through a bottom wall of the refractory vessel.

14. The apparatus according to claim 13, wherein the plurality of non-powered electrodes are connected by an electrical conductor positioned outside the interior space.

15. The apparatus according to claim 12, wherein the at least one non-powered electrode comprises a plurality of non-powered electrodes extending into the interior space through a wall of the refractory vessel.

16. The apparatus according to claim 15, wherein the plurality of non-powered electrodes are connected by an electrical conductor positioned outside the interior space.

17. The apparatus according to claim 12, wherein the plurality of powered electrodes are arranged in rows along at least portion of a length of the refractory vessel.

18. The apparatus according to claim 12, wherein the precious metal component comprises at least one of a bubbler tube, a thermocouple, or a conduit configured as a flow path for molten glass.

* * * * *